April 19, 1960
M. M. CUNNINGHAM
2,933,356
ASSEMBLY FOR PUMPS AND THE LIKE AND HOLDING
MEANS FOR RETAINING THE PARTS THEREOF
IN ASSEMBLED RELATIONSHIP
Filed Jan. 16, 1959
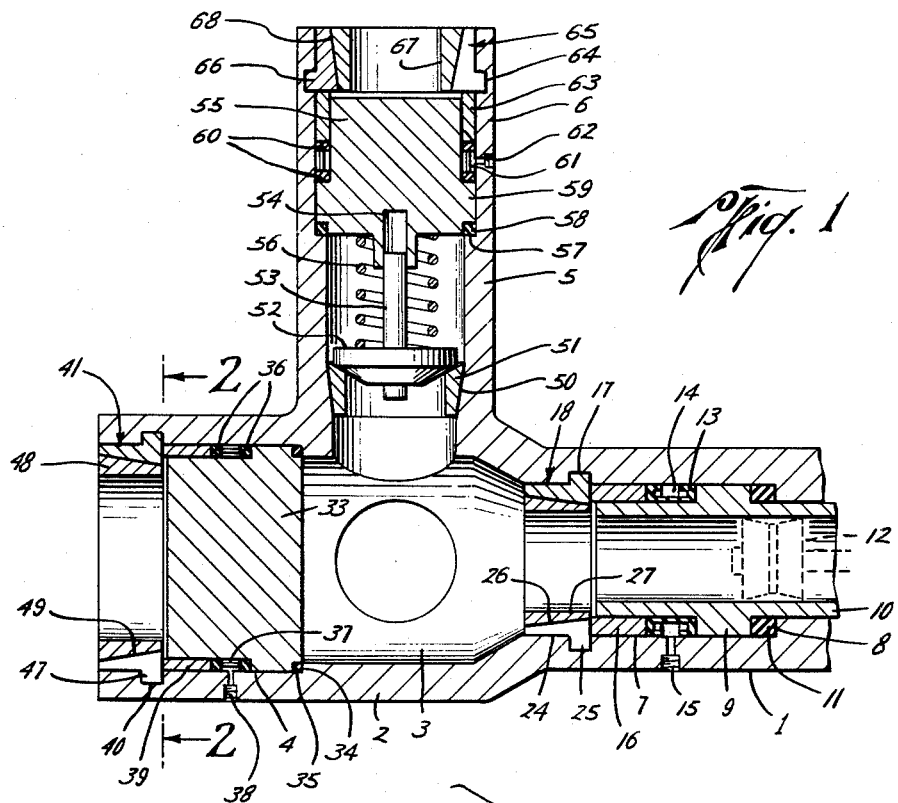
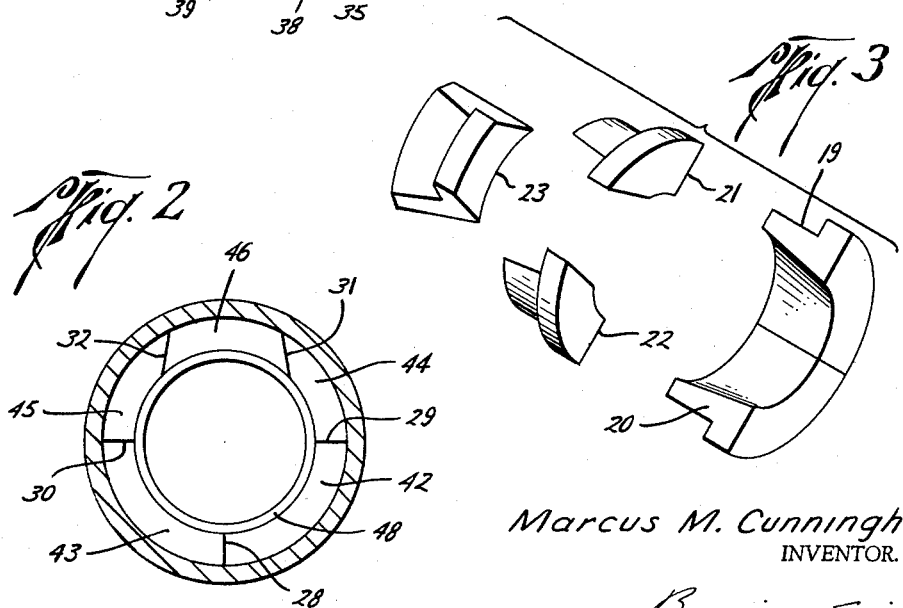
Marcus M. Cunningham
INVENTOR.
BY Browning, Simms,
Hyer & Eickenroht
ATTORNEYS

United States Patent Office 2,933,356
Patented Apr. 19, 1960

2,933,356

ASSEMBLY FOR PUMPS AND THE LIKE AND HOLDING MEANS FOR RETAINING THE PARTS THEREOF IN ASSEMBLED RELATIONSHIP

Marcus M. Cunningham, Houston, Tex.

Application January 16, 1959, Serial No. 787,212

10 Claims. (Cl. 309—2)

This invention relates to assemblies for pumps and the like and particularly to such an assembly in which parts are adapted to be held in assembled relationship by a novel holding means providing substantial advantages over those heretofore employed, when used in such an assembly. It will be understood that this assembly relates to structures other than pumps, as will be obvious to persons skilled in the art. However, for the purposes of this application only a pump construction will be described. It will be understood that the term pump assembly as used in the claims appended to this application is to be construed as embodying not only pumps but other similar structures in which the present invention may be employed for securing the parts together with accompanying advantages of the same character as those provided by the present invention in a pump assembly.

In the past it has been customary to secure cylinder heads, valve pot covers and the like to pump bodies by means of flanges formed on the pump bodies and bolts or studs extending through the cylinder heads or valve pot covers and into openings provided in the flanges on the body. Gaskets were provided between the cylinder heads and bodies and also between the valve pot covers and bodies and by tightening up on the bolts or studs the cylinder heads of the valve pot covers were so tightened against the gaskets as to compress them sufficiently to prevent leakage.

Also, in the past it has been conventional in connection with pumps employing inserted liners in the cylinders to insert such liners until they come to rest against shoulders provided in the interiors of the pump cylinders, and then to secure them in such position by means of a cage construction extending between the ends of the liners and the inner surfaces of the cylinder heads. On occasion means have been provided for tightening such cages in order to tighten the liners in place, one such means being in the form of a set screw extending through the cylinder head and engaging the cage.

These prior art constructions are subject to certain disadvantages, chief among them being the necessity for removal and insertion of numerous bolts or studs in removing and replacing cylinder heads and valve pot covers, as well as in removing and replacing cylinder liners held in place by such cylinder heads. Also, under the stresses encountered in actual pumping operations, leakage frequently occurred due to insufficient tightening of the bolts or studs or the stretching thereof after their initial tightening. Likewise, the liners held in place in the manner described have been permitted to move slightly first in one direction and then in the other as the pump operates, due to the stretching of the bolts or studs under widely fluctuating pressures, and due to the fact that any tightening of the liner construction held in place by a cage such as above described, results in an increase in tension on the bolts or studs holding the cylinder head in place and hence has a greater tendency toward leakage around the cylinder heads.

It is therefore an object of this invention to provide a pump assembly and holding structure for holding the parts thereof in assembled relationship to each other which will be simple and easy to construct and assemble and disassemble and which will not be subject to the likelihood of leakage and other disadvantages above discussed in connection with conventional construction.

It is another object of this invention to provide such a holding means for holding the pump assembly parts together which may be applicable not only to cylinder heads and valve pot covers but independently to the holding of liners in place in pumps.

Other objects and advantages of this invention will become apparent from the following description taken in connection with the accompanying drawings wherein is set forth by way of illustration and example one embodiment of this invention.

In the drawings:

Fig. 1 is a longitudinal cross section through the cylinder and valve pot of a pump of the character ordinarily employed in the pumping of drilling fluid in drilling wells by the rotary drilling method, illustrating this invention in connection with each of the situations of securing the pump liner, the cylinder head, and the valve pot cover in the assembly.

Fig. 2 is a transverse cross section taken along the line 2—2 of Fig. 1 and showing in end elevation the multi-part locking ring forming a part of this invention.

Fig. 3 is an exploded perspective view of the multi-part locking ring illustrated in cross section in Fig. 2, for holding the cylinder liner in place.

Referring now more in detail to the drawings, the numeral 1 indicates the cylinder portion of the usual pump body employed in so-called slush pumps for pumping drilling fluid in the drilling of wells. This body is enlarged at 2 to provide a pumping chamber 3 at one end of the cylinder 1 and is extended beyond the pumping chamber as shown at 4 to provide a cylinder head opening through which the cylinder liner and its associated parts may be removed or replaced. Extending from the pumping chamber 3 at substantially right angles to the axis of the cylinder 1 is a valve pot 5 having an extension 6 therefrom through which access may be had to the valve located therein and its associated parts as will be presently described.

That end of the cylinder which is adjacent the pumping chamber 3 is counterbored as shown at 7 for a short distance from the pumping chamber 3 and is formed with a shoulder 8 facing toward the pumping chamber 3 at the inner end of this counterbore. This shoulder 8 serves as a stop for the flange 9 on the pump cylinder liner 10 which is located within the cylinder 1, limiting the amount of movement of this pump liner in a direction away from the pumping chamber 3. In order to seal between the liner 10 and the cylinder 1 a seal ring 11 may be provided between the flange 9 and the shoulder 8.

It will be understood that the usual pump piston 12 is intended to operate within the liner 10 and that this liner is open at both ends so that the pumped fluid may flow into and out of each end as the piston 12 is reciprocated.

The construction thus far described in connection with the mounting of the pump liner 10 is very similar to conventional construction. However, instead of holding the liner 10 in place tight against the shoulder 8 by means of a cage between the liner and cylinder head for the pump, it is preferred in accordance with this invention that the liner be held in place in the manner illustrated which is entirely independent of the cylinder head or the manner of securing the cylinder head in place.

Disposed against the opposite side of the flange 9 from the shoulder 8 is an annular inflatable packing or seal ring 13 having a hollow interior 14 which when the parts are disposed in the fashion intended within the pump will have its open channel which extends around its exterior registering with the opening 15 through the body of the pump. It is intended that a source of pressure fluid may be applied to the opening 15 for the purpose of forcing fluid under pressure into the interior of the ring 13 and inflating the same causing it to expand and form a seal not only with the interior of the counterbore 7 and the exterior of the liner 10, but also with the adjacent surfaces of the flange 9 and of the filler ring 16 which is located between the counterbore 7 and the liner 10 on the opposite side of the ring 13 from the flange 9.

It will be understood that in assembling the liner 10 within the pump the liner will first be inserted through the opening 4 which is later to be closed by the cylinder head in the manner presently to be described, with the ring 11 surrounding the liner 10 on one side of the flange 9 and the ring 13 surrounding the liner 10 on the other side of the flange 9. The ring 16 may also be in place during the insertion of liner 10 or may be put in later.

After the insertion of the liner and the ring 16, the means for securing and locking these parts in place will be employed. It is noted in this connection that there is in the wall of the counterbore 7 adjacent the pumping chamber an internal circumferential groove 17. That side of the groove 17 which is most remote from the shoulder 8 provides a stop means to receive the locking apparatus yet is of sufficiently large diameter to pass the part which fits the opening in the pump body, namely the liner 10, and permit it to move against the shoulder 8 which provides a stop means to limit the movement of the part 10 inwardly of the body 1.

The actual locking means for locking the liner 10 and its associated rings 11, 13 and 16 in place is in the form of a multi-part ring 18 which is shown more in detail in the perspective view of Fig. 3. This ring may consist of any desired number of parts and is not necessarily limited to a five part ring as illustrated. However, the number of parts should be determined to provide greatest convenience of assembly without undue multiplication of parts and, in the instance shown, five segmental parts 19, 20, 21, 22 and 23 are employed. Taken together, these parts provide a complete circular multi-part ring. The divisions between parts 19 and 20 and between these parts and parts 21 and 22 may be along radial lines or any other convenient lines such that these parts may be put in place with their outer cylindrical portions 24 in engagement with the interior of the counterbore 7 outwardly of the circumferential groove 17, and their flanges 25 in engagement with the groove 17. After the parts 19, 20, 21 and 22 have been thus put in place and moved into engagement with each other there will be left between them a space of exactly the size and shape to receive the part 23. In order that this part 23 may be put in place last, it should have its circumferential dimension at any given point small enough to enable it to pass radially outwardly or inwardly through the space left by the assembly of the other parts of the ring, to and from the position which it will occupy in making up the complete ring. Thus, a simple form of this member is one in which, as illustrated, its opposite sides flare away from each other in a direction toward the axis of the cylinder. It will be appreciated that the angle between these opposite sides may be varied from the specific angle shown, either to a wider angle or to a narrower angle, but that these sides must not converge toward each other in a direction toward the axis of the cylinder.

It will be seen that with the multi-part ring just described in place as illustrated, the ring 16 will be held against endwise movement in a direction away from the shoulder 8 and this in turn will secure in place the liner 10 together with the seal rings 11 and 13.

It will be understood that normally it is desirable that the liner 10 be held firmly in position against any substantial endwise movement during the operation of the pump and that the fluctuations in pressure exerted thereon tend strongly to cause such endwise movement. In order to thus secure the liner 10 against endwise movement, fluid under pressure may be injected through the opening 15 into the interior of the expansible packing ring 13. As above explained, this will expand this packing not only in a radial direction but also in a longitudinal direction and hence serve to firmly urge the flange 9 towards the shoulder 8 and securely lock the liner 10 in place. It is contemplated that such inflating pressure will be maintained within the ring 13 during the entire period of its use.

It will be understood that the multi-part ring may be so inserted that the part 23 is located at the bottom portion of the ring and that in this event the ring would be substantially held in place by the force of gravity. It will also be understood that the ring may be held in place by hand or in some other fashion until pressure is built up within the ring 13 and that thereafter the frictional engagement between the ring and the stop provided by the side wall of the groove 17 will tend to hold parts of the multi-part ring in place.

However, against the possibility of accidental removal of the pressure from the ring 13 and possible accidental dislodgement of the parts of the multi-part ring due to vibration or other causes, it may be desirable to lock the parts of the multi-part ring in place. This may be done by making the inner surfaces of the multi-part ring tapered as shown at 26 to receive the tapered exterior of a complete circular wedge ring 27. Preferably the angle of the taper between the surface 26 and wedge ring 27 will be such as will cause the wedge ring to stick in place when forced into the interior of the multi-part ring. Such a taper is known as a "sticking" or "self-holding" taper. See Machinery's Handbook, 14th ed. (1951), p. 1412, pub. by The Industrial Press, 148 Lafayette Street, New York 13, New York.

With the structure just described the assembly of the liner within the pump body will be securely and adequately locked together for operation, yet may be disassembled with great ease by merely relieving the pressure within the ring 13 and then removing the multi-part ring and the liner with its associated seal rings. This operation may be very quickly accomplished without the use of special tools.

Turning now to the cylinder head assembly and means for locking it in place, a multi-part ring is provided similar in all respects except size to that just described in connection with the liner securing assembly, the segmental portions of this ring being divided from each other along the substantially radial lines 28, 29, and 30, and by two lines which diverge in a direction toward the axis as shown at 31 and 32, all as illustrated in Fig. 2. This multi-part ring is employed to secure in place a cylinder head 33 which is adapted to move inwardly until stopped by a stop 34 preventing it from moving further inwardly of the body. The seal ring 35 may, if desired, be employed between the outwardly facing shoulder 34 and the cylinder head 33. This cylinder head has a reduced diameter outer portion along a portion thereof remote from the shoulder 34, and disposed on this reduced diameter portion are a pair of seal rings 36 having metal spacers therebetween as shown at 37 so as to in effect provide an inflatable seal which may be inflated through an opening 38 extending through the body. It will be understood that the specific type of inflatable ring here employed may be of a different type such as for example the ring 13 shown in the right hand portion of this figure. Disposed over the exterior of the cylinder head 33 on the outer side of the inflatable seal ring is a filler ring 39 similar in function to the filler ring 16 around the exterior of the liner 10. Preferably this filler ring is so sized that it will extend outwardly slightly beyond the outer extremity of cylinder head 33 to be engaged by and held by the multi-part ring 41.

The interior of the body just beyond the end of the ring 39 is provided with a groove 40 to receive the multi-part ring 41. As illustrated in Fig. 2 this ring consists of segmented parts 42 and 43 which are divided from each other by the radial line 28, and the parts 44 and 45 which are each divided from the adjacent segmental parts 42 and 43 by radial lines 29 and 30. Thus, the parts 42, 43, 44 and 45 can all be put in place by moving them individually into the opening in the body and then moving them radially outwardly until their respective flanges 47 engage the groove 40 in the interior of the body. Finally, the segmental part 46, which will be inserted last, and which is divided from the adjacent segmental parts 44 and 45 by lines 31 and 32 which diverge in a direction generally toward the axis of the body, may be put in place by moving it into the opening in the body in an axial direction and then radially into its position as shown in Fig. 2.

This multi-part ring may likewise be maintained in position without additional securing means in a manner described in connection with the multi-part ring 18, but may be secured in position by means of a wedge ring 48 engaging the multi-part ring along a tapered surface 49 formed on such an angle that the ring 48 when forced home between the parts of the multi-part ring will stick in place and thereby securely wedgelock the multi-part ring in position with a "sticking" or "self-holding" taper.

Just as in the previous description, the inflatable seal 36 may thereupon be inflated by pressure applied through the opening 38, and will expand in a longitudinal or axial direction so as to force the cylinder head 33 tightly against the stop 34 except for the interposition of the seal ring 35 therebetween, and by reaction force the ring 39 tightly against the multi-part ring 41. Such locking pressure will remain upon the ring 36 during the entire useful life thereof.

Turning now to the valve pot illustrated in the upper portion of Fig. 1, this pot will preferably be formed on its inner surface with a tapered seat 50 adapted to receive the valve seat element 51 which in turn provides a seat for the outlet valve 52. This valve has a guide stem 53 extending upwardly therefrom and slidably carried in a guide opening 54 in the valve pot cover 55. Surrounding the stem 53 between the valve 52 and the valve pot cover 55 is a spring 56 which normally urges the valve towards seated or closed position.

Except for the construction of the valve pot cover and the structure now to be described, the valve and valve pot are of a construction similar to that conventionally employed.

Valve pot cover 55 is adapted to be stopped on its movement in a direction inwardly of the pump body by means of a stop or shoulder 57, a seal ring 58 being mounted between this shoulder and the valve pot cover flange 59, if so desired. The flange 59 is made of such a size as to fit within the counterbored upper extension of the valve pot and be stopped by the shoulder 57. On the opposite side of this flange from the shoulder 57 is an expansible seal ring provided by the two sealing material rings 60 having a spacer means 61 interposed therebetween. These are so disposed as to register with an inflating opening 62 through the body whereby pressure fluid may be injected into the space between the rings 60 causing these rings to separate and move in an axial direction away from each other.

Located around the uppermost portion of the valve pot cover 55 is a ring 63 similar in all respects except size to the rings 16 and 39 heretofore described. This ring likewise projects slightly beyond the upper extremity of valve pot cover 55. Substantially at the upper extremity of this ring the interior of the body of the pump is provided with a circumferential groove 64 adapted to receive the multi-part locking ring 65. This multi-part locking ring is substantially similar in all respects except size to the multi-part locking rings 18 and 41 heretofore described. It is provided with external flange 66 engaging the groove 64 to lock it against axial movement and the parts of this locking ring may be put in place in the same manner as heretofore described in connection with the previously mentioned locking rings. When in such position they will prevent movement of the filler ring 63 outwardly of the body and, when fluid under pressure is injected through the opening 62 between the rings 60 to force these rings apart, the result will be a tightening of the valve pot cover 55 against the shoulders 57 and a reactionary tightening of the filler ring 63 against the multi-part ring 65.

As in the previously described structures, if it is desired to lock the multi-part ring in place, this may be accomplished by means of a wedge ring 67 forced into the tapered interior 68 of the multi-part ring. Here again this taper may be a "sticking" or "self-holding" taper formed on such an angle that when the wedge ring is forced into it the wedge ring will stick in place and not be readily dislodged.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombination. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a pump assembly having, in combination, a pump body with an opening therein, a part fitting said opening and secured therein, and stop means carried by the body adapted to be engaged by said part to limit movement of said part inwardly of said body, the improvement which comprises shoulder means on said body in said opening outwardly from said stop means and of an internal dimension to permit passage of said part between the exterior of the body and said stop means, and a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means and of such internal assembled size that it will prevent outward movement therethrough of said part, whereby said part will be confined in said opening between said stop means and said multi-part ring.

2. In a pump assembly having, in combination, a pump body with an opening therein, a part fitting said opening and secured therein, and stop means carried by the body adapted to be engaged by said part to limit movement of said part inwardly of said body, the improvement which comprises shoulder means on said body in said opening outwardly from said stop means and of an internal dimension to permit passage of said part between the exterior of the body and said stop means, a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means, and of such internal assembled size that it will prevent outward movement therethrough of said part, whereby said part will be confined in said opening between said stop means and said multi-part ring, and means locking said multi-part ring in assembled position in said opening.

3. In a pump assembly having, in combination, a pump body with an opening therein, a part fitting said opening and secured therein, and stop means carried by the body adapted to be engaged by said part to limit movement of said part inwardly of said body, the improvement which comprises shoulder means on said body in said opening outwardly from said stop means and of an internal dimension to permit passage of said part between the exterior of the body and said stop means, a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means, and of such internal assembled size that it will prevent outward movement therethrough of said part, whereby said part will be confined in said opening between said stop means and said multi-part ring, and a wedge ring wedged into said multi-part ring and locking it in assembled position in said opening.

4. In a pump assembly having, in combination, a pump body with an opening therein, a part fitting said opening and secured therein, and stop means carried by the body adapted to be engaged by said part to limit movement of said part inwardly of said body, the improvement which comprises shoulder means on said body in said opening outwardly from said stop means and of an internal dimension to permit passage of said part between the exterior of said body and said stop means, a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means, and of such internal assembled size that it will prevent outward movement therethrough of said part, whereby said part will be confined in said opening between said stop means and said multi-part ring, said multi-part ring having an inner surface tapering toward said part, and a wedge ring having its outer surface with the same external taper wedged into said multi-part ring to lock it in assembled position in said opening.

5. A pump assembly as set forth in claim 4 in which the taper fit between said multi-part ring and said wedge ring is a sticking taper.

6. In a pump assembly having, in combination, a pump body with an opening therein, a part fitting said opening and secured therein, and stop means carried by the body and adapted to be engaged by said part to limit movement of said part inwardly of said body, the improvement which comprises shoulder means on said body in said opening outwardly from said stop means and of an internal dimension to permit passage of said part between the exterior of the body and said stop means, a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means, and of such internal assembled size that it will prevent outward movement therethrough of said part, whereby said part will be confined in said opening between said stop means and said multi-part ring, and axially expansible means engaging said part and said multi-part ring whereby upon expansion thereof the said part will be forced against said stop means.

7. In a pump assembly having, in combination, a pump body with an opening therein, a part fitting said opening and secured therein, and stop means carried by the body adapted to be engaged by said part to limit movement of said part inwardly of said body, the improvement which comprises shoulder means on said body in said opening outwardly from said stop means and of an internal dimension to permit passage of said part between the exterior of the body and said stop means, a multi-part ring whose parts are each of a maximum dimension less than the internal dimension of said shoulder means so that said ring is insertable in parts into said opening past said shoulder means, said ring being capable of assembly with its largest assembled diameter portion inwardly of said shoulder means and of such external assembled size greater than the internal dimension of said shoulder means so that it will not move outwardly of said body past said shoulder means, and of such internal assembled size that it will prevent outward movement therethrough of said part, whereby said part will be confined in said opening between said stop means and said multi-part ring, and an axially movable abutment member on said part and hydraulic means on said part for forcing said abutment member along said part toward said multi-part ring and said part towards said stop means.

8. The assembly of claim 1 in which said shoulder means is formed by the outer wall of a groove cut in the wall of said opening.

9. The assembly of claim 1 in which said shoulder means is formed by the outer wall of a circumferential groove cut in the wall of said opening.

10. The assembly of claim 1 in which one of the parts of said multi-part ring has its circumferential dimension at each point of its radial extent small enough to enable it to pass radially outwardly into the space left by the assembly of the other parts of said ring.

References Cited in the file of this patent

UNITED STATES PATENTS 2,045,024   Renken et al. _____ June 23, 1936